US010465745B2

(12) United States Patent
Nakashima

(10) Patent No.: US 10,465,745 B2
(45) Date of Patent: Nov. 5, 2019

(54) THRUST ROLLER BEARING CAGE AND THRUST ROLLER BEARING

(71) Applicant: JTEKT CORPORATION, Osaka-shi, Osaka (JP)

(72) Inventor: Yoshihito Nakashima, Kariya (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/964,184

(22) Filed: Apr. 27, 2018

(65) Prior Publication Data

US 2018/0328406 A1 Nov. 15, 2018

(30) Foreign Application Priority Data

May 12, 2017 (JP) ................................ 2017-095775

(51) Int. Cl.
*F16C 19/30* (2006.01)
*F16C 33/46* (2006.01)
*F16C 33/66* (2006.01)
*F16C 19/36* (2006.01)

(52) U.S. Cl.
CPC .......... *F16C 19/305* (2013.01); *F16C 19/361* (2013.01); *F16C 33/467* (2013.01); *F16C 33/4676* (2013.01); *F16C 33/6651* (2013.01); *F16C 33/6681* (2013.01); *F16C 2361/65* (2013.01)

(58) Field of Classification Search
CPC ...... F16C 19/46; F16C 19/305; F16C 19/361; F16C 33/46; F16C 33/467; F16C 33/6607; F16C 33/6629; F16C 33/6651; F16C 33/6681
USPC ........ 384/597, 606, 615, 617, 622, 623, 614
See application file for complete search history.

(56) References Cited

U.S. PATENT DOCUMENTS

| 6,102,580 A * | 8/2000 | Alling ..................... F16C 19/30 384/470 |
| 2004/0091193 A1* | 5/2004 | Obayashi ................ F16C 33/48 384/623 |
| 2006/0165334 A1* | 7/2006 | Obayashi ................ F16C 19/30 384/622 |

FOREIGN PATENT DOCUMENTS

| JP | H02-004026 U | | 1/1990 | |
| JP | 2003-120683 A | | 4/2003 | |
| JP | 2004316670 A | * | 11/2004 | .......... F16C 33/6681 |
| JP | 2004-340269 A | | 12/2004 | |
| JP | 2004340269 A | * | 12/2004 | .............. F16C 33/46 |
| JP | 2005-054895 A | | 3/2005 | |
| JP | 2006-118696 A | | 5/2006 | |
| JP | 2006200676 A | * | 8/2006 | .............. F16C 33/46 |

(Continued)

*Primary Examiner* — Marcus Charles
(74) *Attorney, Agent, or Firm* — Oliff PLC

(57) ABSTRACT

A thrust roller bearing cage having pockets for accommodating rollers includes an inner annular portion and cage bars that extend in a radial manner from a radially outer edge of the inner annular portion so as to separate the pockets from each other in a circumferential direction. The inner annular portion has a first axial end surface and a second axial end surface. The first axial end surface has an oil passage groove for guiding lubricating oil to the pockets. The second axial end surface is recessed relative to the first axial end surface in an axial direction of the inner annular portion so as to form a recessed portion that communicates with the oil passage groove. The entire region of the first axial end surface that is located radially directly inside the cage bars is located radially outside the second axial end surface.

10 Claims, 6 Drawing Sheets

FIRST EMBODIMENT

(56) References Cited

FOREIGN PATENT DOCUMENTS

| JP | 2006-250222 A | | 9/2006 | |
|---|---|---|---|---|
| JP | 2007154936 A | * | 6/2007 | ............. F16C 33/46 |
| JP | 2007154937 A | * | 6/2007 | ......... F16C 33/6681 |
| JP | 2015-224646 A | | 12/2015 | |

* cited by examiner

FIRST EMBODIMENT

FIRST EMBODIMENT

FIRST EMBODIMENT

FIRST EMBODIMENT

FIRST EMBODIMENT

FIRST EMBODIMENT

SECOND EMBODIMENT

SECOND EMBODIMENT

SECOND EMBODIMENT

SECOND EMBODIMENT

SECOND EMBODIMENT

SECOND EMBODIMENT

THRUST ROLLER BEARING CAGE AND THRUST ROLLER BEARING

INCORPORATION BY REFERENCE

The disclosure of Japanese Patent Application No. 2017-095775 filed on May 12, 2017 including the specification, drawings and abstract, is incorporated herein by reference in its entirety.

BACKGROUND OF THE INVENTION

1. Field of the Invention

The invention relates to a thrust roller bearing cage and a thrust roller bearing.

2. Description of Related Art

Thrust roller bearings are widely used in various fields. The thrust roller bearing supports a rotating member while receiving an axial thrust force. The thrust roller bearing includes multiple rollers as cylindrical rolling elements accommodated in cage pockets. The rolling of the rollers allows the rotating member to rotate smoothly. When the roller rolls in the cage pocket, the outer circumferential surface of the roller slides on the inner peripheral surface of the pocket.

A thrust roller bearing (a thrust needle roller bearing) disclosed in Japanese Patent Application Publication No. 2004-340269 (JP 2004-340269 A) has oil passage grooves for facilitating supply of oil to pockets of a cage. The oil passage grooves are formed in an annular portion of the cage. The annular portion is located radially inside the pockets. The oil passage grooves extend in a radial direction from the radially inner edges of the pockets to the inner peripheral surface of the cage.

In the thrust roller bearing disclosed in JP 2004-340269 A, lubricating oil is supplied to the pockets more easily than in those without such oil passage grooves. Thus, the oil passage grooves reduce wear and seizure of the rollers and the cage. However, supplying more lubricating oil to cage pockets may be required depending on the usage conditions of a thrust roller bearing, such as the rotation speed of a rotating member supported by the thrust roller bearing.

SUMMARY OF THE INVENTION

A purpose of the invention is to provide a thrust roller bearing cage and a thrust roller bearing for improving lubricity.

An aspect of the invention provides a thrust roller bearing cage having pockets for accommodating rollers. The cage includes an inner annular portion and cage bars that extend in a radial manner from a radially outer edge of the inner annular portion so as to separate the pockets from each other in a circumferential direction. The inner annular portion has a first axial end surface and a second axial end surface. The first axial end surface has an oil passage groove for guiding lubricating oil to the pockets. The second axial end surface is recessed relative to the first axial end surface in an axial direction of the inner annular portion so as to from a recessed portion that communicates with the oil passage groove. The entire region of the first axial end surface that is located radially directly inside the cage bars is located radially outside the second axial end surface.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of the invention is described with reference to FIGS. 1A through 3. While the invention will be described in conjunction with specific embodiments that illustrate various preferred technical features, it is to be understood that the embodiments are not intended to limit the invention.

Figure 1A:
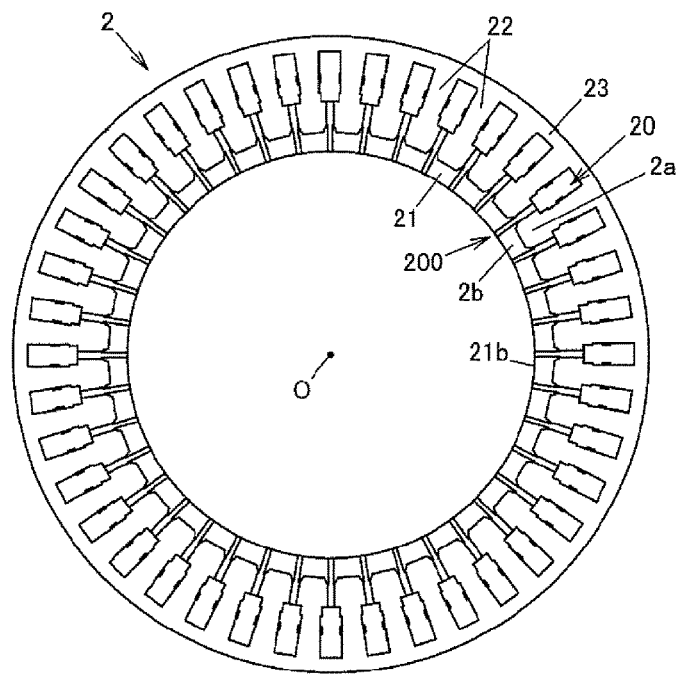
FIG. 1A is an overall plan view of a cage according to a first embodiment of the invention.
Figure 1B:
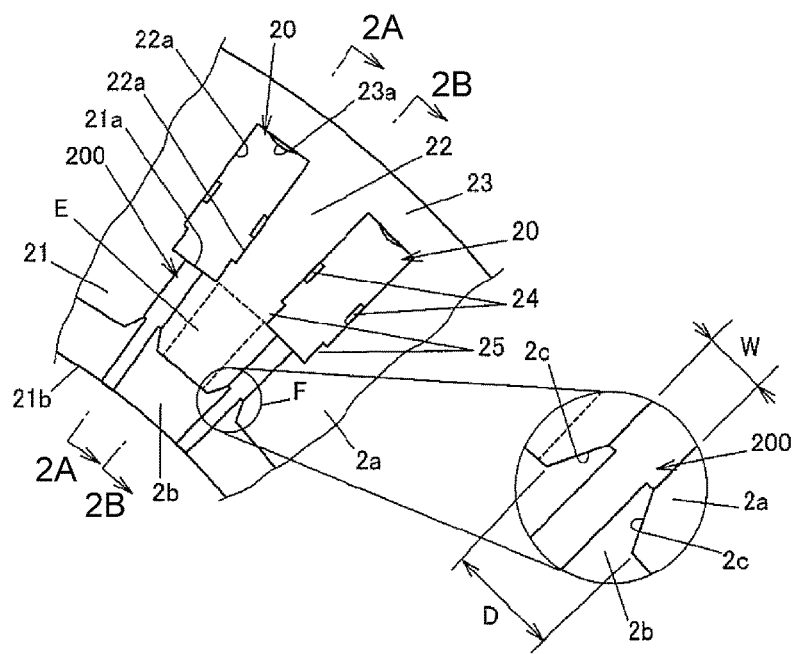
FIG. 1B is a partial enlarged view of FIG. 1A.
Figure 2A:
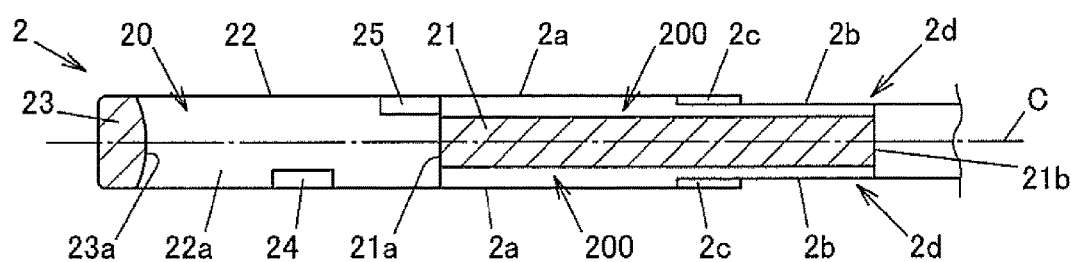
FIG. 2A is a cross-sectional view taken along line 2A-2A in FIG. 1B.
Figure 2B:
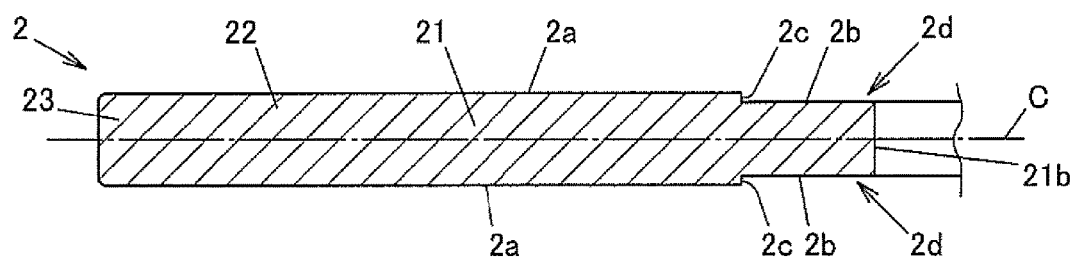
FIG. 2B is a cross-sectional view taken along line 2B-2B in FIG. 1B.
Figure 2C:
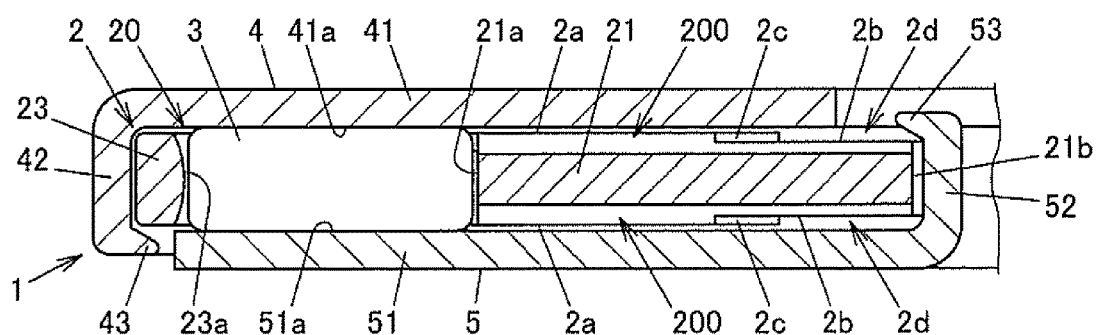
FIG. 2C is a cross-sectional view of a thrust roller bearing according to the first embodiment.
Figure 3:
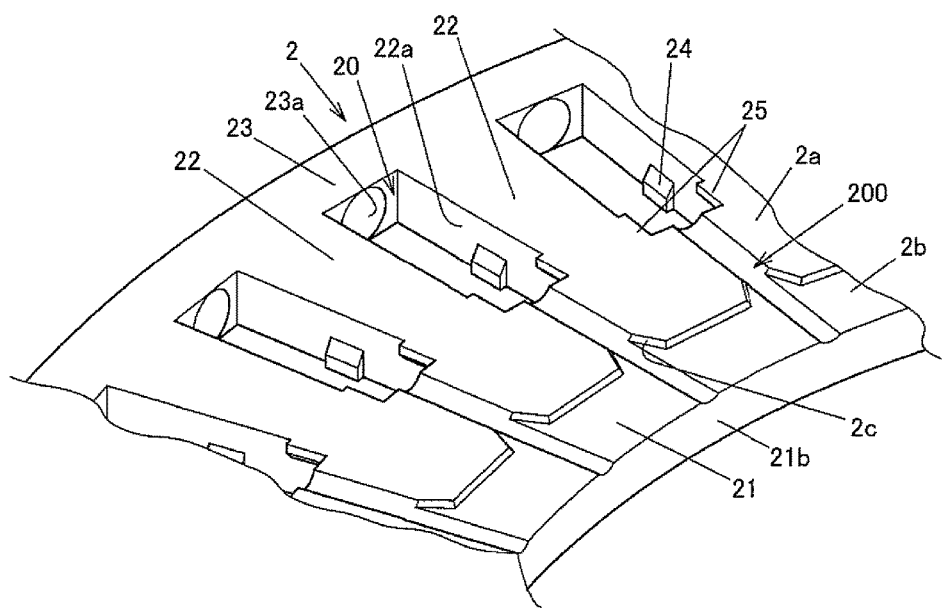
FIG. 3 is a partial perspective view of the cage.

FIG. 1A is an overall plan view of a thrust roller bearing cage (hereinafter referred to simply as the "cage") 2 according to the first embodiment of the invention. FIG. 1B is a partial enlarged view of FIG. 1A. FIG. 2A is a cross-sectional view taken along line 2A-2A in FIG. 1B. FIG. 2B is a cross-sectional view taken along line 2B-2B in FIG. 1B. FIG. 2C is a cross-sectional view of a thrust roller bearing 1 including the cage 2. FIG. 3 is a partial perspective view of the cage 2.

As illustrated in FIG. 2C, the thrust roller bearing 1 includes the cage 2, multiple cylindrical rollers 3 retained by the cage 2, and a pair of bearing washers, namely, a first bearing washer 4 and a second bearing washer 5. The thrust roller bearing 1 is installed, for example, in vehicle automatic transmissions and compressors, and is used under lubricated conditions with lubricating oil.

The cage 2 has an overall disk shape and is sandwiched between the first bearing washer 4 and the second bearing washer 5. The cage 2 has multiple pockets 20 that are spaced from each other at regular intervals in a circumferential direction. Each of the pockets 20 accommodates a different one of the rollers 3. Each of the rollers 3 has a central axis and is rollable on the central axis within the corresponding pocket 20. In the description below, a direction parallel to a central axis O of the cage 2 is referred to as an axial direction or axially, and a direction perpendicular to the axial direction is referred to as a radial direction or radially. According to the first embodiment, the cage 2 is formed by injection molding of resin. Alternatively, the cage 2 may be formed by press working from sheet or plate metal.

The first bearing washer 4 is a one-piece member including a disk portion 41, a cylindrical portion 42, and catch claws 43. The disk portion 41 has an annular plate shape. The cylindrical portion 42 extends in the axial direction from a radially outer edge of the disk portion 41 and covers an outer circumferential surface of the cage 2. The catch claws 43 protrude radially inward from a tip end of the cylindrical portion 42 and catch the cage 2. The second bearing washer 5 is a one-piece member including a disk portion 51, a cylindrical portion 52, and catch claws 53. The disk portion 51 has an annular plate shape. The cylindrical portion 52 extends in the axial direction from a radially inner edge of the disk portion 51 and covers an inner circumferential surface of the cage 2. The catch claws 53 protrude radially outward from the tip of the cylindrical portion 52 and catch the cage 2. The catch claws 43 are formed at different locations along the circumference of the first bearing washer 4. The catch claws 53 are formed at different locations along the circumference of the second bearing washer 5.

The cage 2 is located between the disk portion 41 of the first bearing washer 4 and the disk portion 51 of the second bearing washer 5. The first bearing washer 4 has a raceway 41a on one side of the disk portion 41. The rollers 3 rolls on the raceway 41a. The second bearing washer 5 has a raceway 51a on one side of the disk portion 51. The rollers 3 rolls on the raceway 51a. Relative rotation between the first and second bearing washers 4 and 5 causes the rollers 3 to roll on the raceways 41a and 51a. When the rollers 3 roll, the cage 2 rotates relative to the first and second bearing washers 4 and 5.

The cage 2 is a one-piece member including an inner annular portion 21, multiple cage bars 22, and an outer annular portion 23. The cage bars 22 extend in a radial manner from a radially outer edge of the inner annular portion 21 to separate the pockets 20 from each other in the circumferential direction. The outer annular portion 23 is located radially outside the pockets 20. The inner annular portion 21 and the outer annular portion 23 are connected by the radially extending cage bars 22. The pockets 20 are formed between the inner annular portion 21 and the outer annular portion 23.

Each of the pockets 20 has an inside surface that includes the following: a radially inner wall surface 21a defined by the inner annular portion 21; a pair of side wall surfaces 22a that circumferentially face each other and that are defined by adjacent two of the cage bars 22; and a radially outer wall surface 23a defined by the outer annular portion 23. When the roller 3 rolls in the pocket 20, the outer circumferential surface of the roller 3 slides on one of the pair of side wall surfaces 22a. An outer end surface of the roller 3 that faces toward the outer annular portion 23 abuts against the outer wall surface 23a. The outer wall surface 23a has a convex shape that allows the outer wall surface 23a to abut against the center of the outer end surface of the roller 3. The pair of side wall surfaces 22a have their respective claw portions 24 and 25 for preventing the roller 3 from falling off the pocket 20. The roller 3 is retained in the pocket 20 by elastic deformation of the cage bars 22.

The cage 2 has oil passage grooves 200 for guiding lubricating oil to the pockets 20 by centrifugal force that is generated by rotation of the cage 2. The cage 2 has a first axial end surface 2a and a second axial end surface 2b. The second axial end surface 2b is recessed relative to the first axial end surface 2a in the axial direction. A step surface 2c is formed between the first axial end surface 2a and the second axial end surface 2b. In FIGS. 2A and 2B, a central line C of the cage 2 in the axial direction (in the thickness direction of the cage 2) is represented by a long dashed short dashed line. The first axial end surface 2a protrudes in a direction that causes the first axial end surface 2a to be located farther from the central line C than the second axial end surface 2b.

According to the first embodiment, each side of the cage 2 (i.e., a first side facing the disk portion 41 of the first bearing washer 4, and a second side facing the disk portion 51 of the second bearing washer 5) has the first axial end surface 2a and the second axial end surface 2b. The oil passage grooves 200 are formed in each of the first and second sides of the cage 2. Alternatively, the oil passage grooves 200 may be formed only in the first side of the cage 2 that faces the first bearing washer 4. Even in this case, lubricating oil that has been supplied from a space between the disk portion 41 of the first bearing washer 4 and the cylindrical portion 52 of the second bearing washer 5 is efficiently guided to the pockets 20 through the oil passage grooves 200. When each side of the cage 2 has the same structure as in the first embodiment, there is no need to consider which side of the cage 2 is the first or second side when assembling the cage 2 and the first and second bearing washers 4 and 5 together. Thus, an assembly error is reduced.

The first axial end surface 2a entirely covers the cage bars 22 and the outer annular portion 23 while partially covering the inner annular portion 21. The second axial end surface 2b covers the rest of the inner annular portion 21 that is uncovered by the first axial end surface 2a. The oil passage grooves 200 are formed in the first axial end surface 2a. The second axial end surface 2b defines a recessed portion 2d that communicates with the oil passage grooves 200. On the first side of the cage 2, a clearance between the second axial end surface 2b and the disk portion 41 of the first bearing washer 4 in the axial direction is greater than a clearance between the first axial end surface 2a and the disk portion 41 of the first bearing washer 4 in the axial direction. On the second side of the cage 2, a clearance between the second axial end surface 2b and the disk portion 51 of the second bearing washer 5 in the axial direction is greater than a clearance between the first axial end surface 2a and the disk portion 51 of the second bearing washer 5 in the axial direction. This feature facilitates supply of lubricating oil to the recessed portion 2d.

According to the first embodiment, in the axial direction of the cage 2, the depth of the oil passage grooves 200 is greater than the step height between the first axial end surface 2a and the second axial end surface 2b so that the oil passage grooves 200 are formed in both the first and second axial end surfaces 2a and 2b. Alternatively, the oil passage grooves 200 may be formed only in the first axial end surface 2a. According to the first embodiment, the oil passage grooves 200 have a semicircular shape when viewed in the radial direction. The oil passage grooves 200 can have any other suitable shape and may be, for example, rectangular in cross section.

Each of the oil passage grooves 200 extends linearly in the radial direction of the cage 2 from the inner wall surface 21a of a different one of the pockets 20 to an inner circumferential surface 21b of the inner annular portion 21. Thus, a radially outer end of the oil passage groove 200 has an opening in the inner wall surface 21a of the pocket 20, and a radially inner end of the oil passage groove 200 has an opening in the inner circumferential surface 21b of the inner annular portion 21. The oil passage grooves 200 opens partially to the step surface 2c. Part of lubricating oil that has been supplied to the recessed portion 2d flows into the oil passage groove 200 through the opening in the step surface 2c.

The inner annular portion 21 has both the first axial end surface 2a and the second axial end surface 2b. The first axial end surface 2a in the inner annular portion 21 has regions each of which is located radially directly inside a different one of the cage bars 22. The entirety of each of the regions is located radially outside the second axial end surface 2b. In other words, the first axial end surface 2a that is located radially directly inside the cage bars 22 does not reach the radially inner edge of the inner annular portion 21. When the cage 2 is viewed in the axial direction, the second axial end surface 2b is located between the inner circumferential surface 21b of the inner annular portion 21 and the cage bars 22 at any position in the circumferential direction. In FIG. 1B, a dashed line represents a region E of the first axial end surface 2a that is located radially directly inside one of the cage bars 22.

According to the first embodiment, the second axial end surface 2b has an annular shape and is located around a radially inner edge of the inner annular portion 21. Thus, the second axial end surface 2b is located radially inside the first axial end surface 2a at any position in the circumferential direction. The step surface 2c corresponds to an inside diameter surface of a portion that is formed by the first axial end surface 2a in the inner annular portion 21. The oil passage groove 200 opens at least partially through the inside diameter surface.

As illustrated in an enlarged view in FIG. 1B, the second axial end surface 2b has connection portions F each of which is connected to a different one of the oil passage grooves 200 in the first axial end surface 2a. As illustrated in a further enlarged view in FIG. 1B, the second axial end surface 2b is shaped such that the width of the connection portion F in the circumferential direction decreases outward in the radial direction of the inner annular portion 21 (i.e., in a direction toward the cage bars 22). The further enlarged view of FIG. 1B illustrates the connection portion F. At the connection portion F, the step surface 2c in the vicinity of the oil passage groove 200 is inclined with respect to the circumferential direction. A distance D between the step surfaces 2c in the circumferential direction that face each other across the oil passage groove 200 is greatest at their radially inner ends and gradually decreases outward in the radial direction toward a width W of the oil passage groove 200.

According to the thrust roller bearing 1 described above, the second axial end surface 2b reduces the thickness of the inner annular portion 21 so as to form the recessed portion 2d. This feature facilitates supply of lubricating oil to the recessed portion 2d. When the cage 2 rotates, lubricating oil that has been supplied to the recessed portion 2d rotates together with the cage 2 and receives a centrifugal force accordingly. Thus, the lubricating oil flows into the oil passage grooves 200 through the opening in the step surface 2c, moves radially outward, and then enters the pockets 20. As illustrated in FIG. 2C, the clearance between the first axial end surface 2a and the disk portion 41 of the first bearing washer 4 is small, and also the clearance between the first axial end surface 2a and the disk portion 51 of the second bearing washer 5 is small. This feature limits the amount of lubricating oil flowing from the recessed portion 2d onto the regions (the region E in FIG. 1B) of the first axial end surface 2a that are located radially directly inside the cage bars 22. When lubricating oil flows into between the region E of the first axial end surface 2a and the disk portions 41 and 51 of the first and second bearing washers 4 and 5, there is a low possibility that the lubricating oil enters the pockets 20 by flowing over the cage bars 22 by the centrifugal force. In this regard, according to the first embodiment, in the inner annular portion 21 that is located radially inside the cage bars 22, the second axial end surface 2b is located radially inside the first axial end surface 2a at any position in the circumferential direction. Thus, most of lubricating oil supplied to the recessed portion 2d flows into the oil passage grooves 200 through the opening in the step surface 2c so that the amount of lubricating oil flowing onto the regions E is further limited. This feature supplies more lubricating oil to the pockets 20 in the cage 2, thereby lubricating the rollers 3 more effectively.

According to the first embodiment, the second axial end surface 2b has an annular shape and is located around the radially inner edge of the inner annular portion 21. This feature makes it hard for lubricating oil to flow onto the first axial end surface 2a directly from the inner circumferential surface 21b of the inner annular portion 21, thus increasing the proportion of lubricating oil that enters the pockets 20 through the oil passage grooves 200.

According to the first embodiment, the circumferential width of the connection portion F that connects the recessed portion 2d to the oil passage groove 200 in the first axial end surface 2a decreases outward in the radial direction of the inner annular portion 21. This shape of the connection portion F allows lubricating oil to flow into the oil passage groove 200 through the opening in the step surface 2c more smoothly.

Further, according to the first embodiment, the oil passage groove 200 has the opening in the inside surface of the pocket 20 (the inner wall surface 21a defined by the inner annular portion 21). This feature enables lubricating oil to be supplied to the roller 3 over the entire axial length of the roller 3, thus reducing friction between the roller 3 and the inside surface of the pocket 20.

Next, a second embodiment of the invention is described with reference to FIGS. 4A through 6. A thrust roller bearing 1A according to the second embodiment includes a cage 2A, multiple rollers 3, and first and second bearing washers 4 and 5. The rollers 3 and the first and second bearing washers 4 and 5 of the thrust roller bearing 1A have the same structures as those of the thrust roller bearing 1 according to the first embodiment. In FIGS. 4A through 6, the structures common to the first and second embodiments are denoted by the same reference symbols as those used in the first embodiment, and the already described features of the common structures are not described in the second embodiment.

Figure 4A:
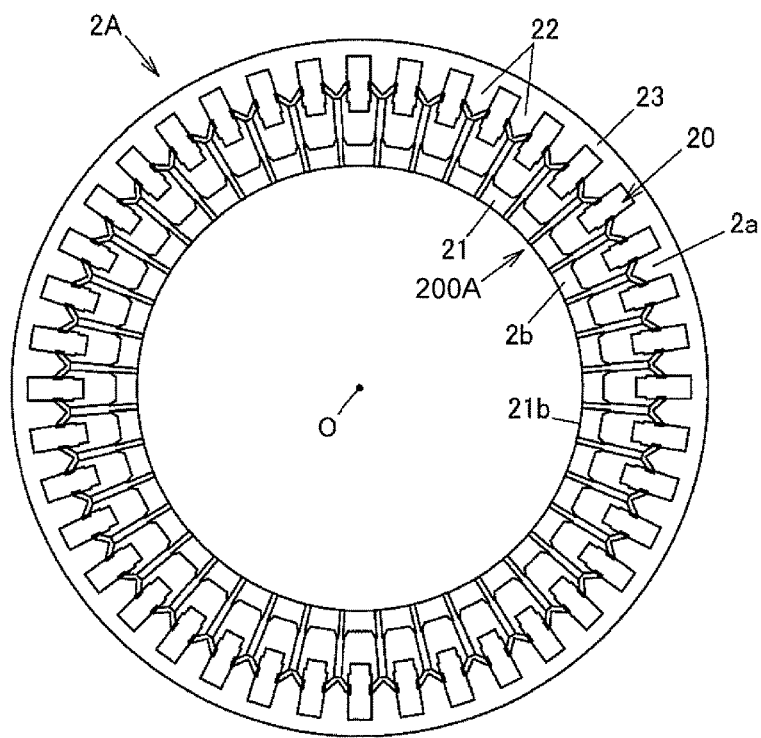
FIG. 4A is an overall plan view of a cage according to a second embodiment of the invention.
Figure 4B:
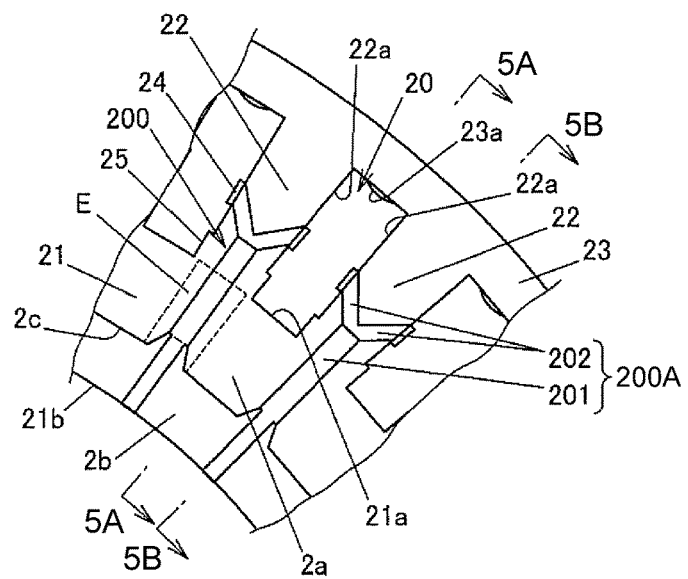
FIG. 4B is a partial enlarged view of FIG. 4A.
Figure 5A:
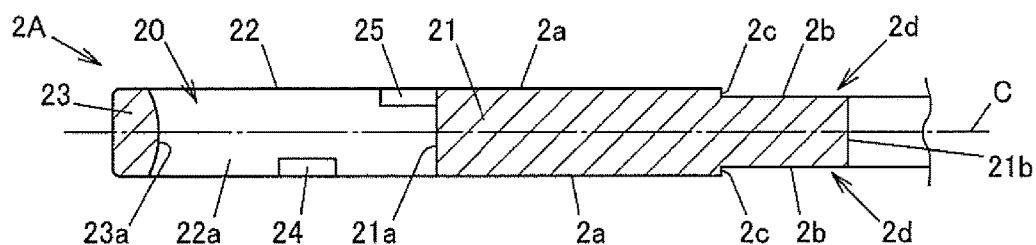
FIG. 5A is a cross-sectional view taken along line 5A-5A in FIG. 4B.
Figure 5B:
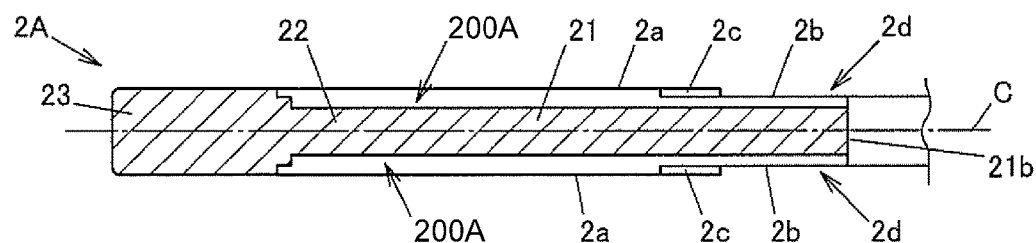
FIG. 5B is a cross-sectional view taken along line 5B-5B in FIG. 4B.
Figure 5C:
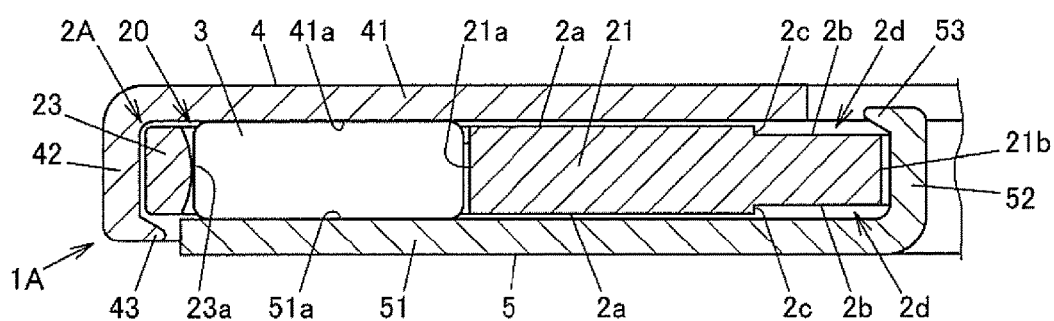
FIG. 5C is a cross-sectional view of a thrust roller bearing according to the second embodiment.
Figure 6:
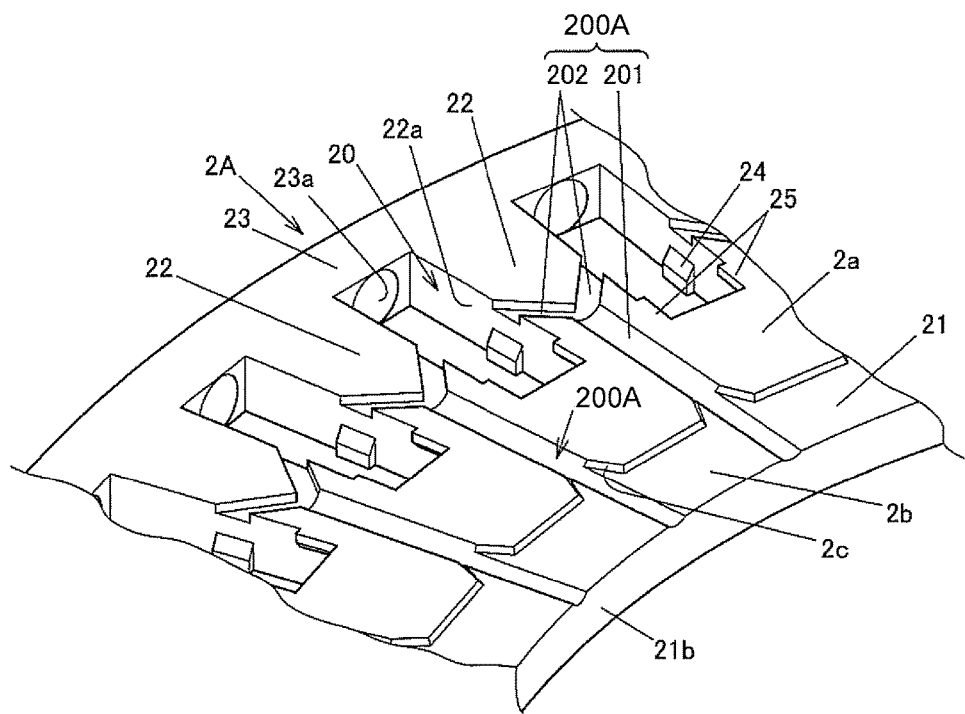
FIG. 6 is a partial perspective view of the cage according to the second embodiment.

FIG. 4A is an overall plan view of the cage 2A according to the second embodiment of the invention. FIG. 4B is a partial enlarged view of FIG. 4A. FIG. 5A is a cross-sectional view taken along line 5A-5A in FIG. 4B. FIG. 5B is a cross-sectional view taken along line 5B-5B in FIG. 4B. FIG. 5C is a cross-sectional view of the thrust roller bearing 1A. FIG. 6 is a partial perspective view of the cage 2A.

As in the cage 2 according to the first embodiment, the cage 2A according to the second embodiment has a first axial end surface 2a and a second axial end surface 2b, and a step surface 2c is formed between the first axial end surface 2a and the second axial end surface 2b. The first and second embodiments differ in the position and shape of oil passage grooves 200. The differences are described in detail below.

According to the first embodiment, the oil passage grooves 200 are formed in the inner annular portion 21 that is located radially inside the pockets 20. On the other hand, according to the second embodiment, the oil passage grooves 200A are formed not only in an inner annular portion 21, but also in cage bars 22. According to the first embodiment, the oil passage grooves 200 extend linearly in the radial direction of the cage 2. On the other hand, according to the second embodiment, each of the oil passage grooves 200A has an overall Y-shape. Specifically, the oil passage groove 200A has a first groove portion 201 and a pair of second groove portions 202. The first groove portion 201 extends linearly in the radial direction of the cage 2A. One of the pair of second groove portions 202 extends from a radially outer end of the first groove portion 201 in one of two directions that are opposite each other along the circumferential direction. The other of the pair of second groove portions 202 extends from the radially outer end of the first groove portion 201 in the other of the two directions.

Part of the first groove portion 201 is formed in the inner annular portion 21, and the rest of the first groove portion 201 is formed in the cage bar 22. The whole of the pair of second groove portions 202 is formed in the cage bar 22. The pair of second groove portions 202 communicate with two pockets 20 that are adjacent to each other in the circumferential direction and that are separated from each other by the cage bar 22 where the first groove portion 201 is formed. One of the second groove portions 202 extends linearly in a first direction inclined with respect to the radial direction of the cage 2A and has an opening in a side wall surface 22a of the cage bar 22 that defines a wall surface of one of the adjacent pockets 20 that faces in the circumferential direction. The other of the second groove portions 202 extends linearly in a second direction inclined with respect to the radial direction of the cage 2A and has an opening in a side wall surface 22a of the cage bar 22 that defines a wall surface of the other of the adjacent pockets 20 that faces in the circumferential direction.

The first groove portion 201 extends radially across a region E of the first axial end surface 2a that is located radially directly inside the cage bar 22, and opens partially through the step surface 2c. As in the first embodiment, the entire region E is located radially outside the second axial end surface 2b. The second axial end surface 2b of the cage 2A has an annular shape and is located around a radially inner edge of the inner annular portion 21. The circumferential width of a connection portion that connects the second axial end surface 2b to the oil passage groove 200A in the first axial end surface 2a decreases outward in the radial direction of the inner annular portion 21.

As in the first embodiment, the second embodiment allows more lubricating oil to be supplied to the pockets 20 in the cage 2A, thus lubricating the rollers 3 more effectively. The second groove portion 202 has the opening in the side wall surface 22a of the cage bar 22. This feature allows lubricating oil to be supplied into the pockets 20 from a position close to where the rollers 3 slides on the cage bars 22, thus lubricating the rollers 3 more effectively.

While the invention has been described with reference to the first and second embodiments, it is to be understood that the invention is not limited to the embodiments. It is not essential that all the features described in the embodiments be combined to carry out the invention.

The embodiments may be modified in various ways within the scope of the invention. Some of the modifications are described below. According to the first and second embodiments, in the vicinity of an opening of the oil passage groove 200 or 200A in the step surface 2c, the step surface 2c is divided by the opening such that the divided step surfaces 2c face each other across the opening in the circumferential direction and are inclined with respect to the circumferential direction. Alternatively, when rotation of the cages 2 and 2A is limited to one direction, only one of the divided step surfaces 2c may be inclined with respect to the circumferential direction such that lubricating oil receiving the centrifugal force caused by the rotation can easily flow into the oil passage groove 200 or 200A.

According to the first and second embodiments, the first and second axial end surfaces 2a and 2b that are displaced from each other in the axial direction are formed on each side of each of the cages 2 and 2A. Alternatively, for example, one side of each of the cages 2 and 2A that faces the disk portion 51 of the second bearing washer 5 may be flat without a step.

According to the first and second embodiments, each of the thrust roller bearings 1 and 1A has the first and second bearing washers 4 and 5. Alternatively, an assembly consisting of the cage 2 or 2A and the rollers 3 may be a thrust roller bearing.

A thrust roller bearing cage and a thrust roller bearing according to the invention make it possible to supply more lubricating oil to cage pockets, thus lubricating rollers more effectively.

What is claimed is:

1. A thrust roller bearing cage having a plurality of pockets for accommodating rollers, the cage comprising;
    an inner annular portion having an axial direction, a radial direction, and a circumferential direction; and
    a plurality of cage bars extending in a radial manner from a radially outer edge of the inner annular portion so as to separate the plurality of pockets from each other in the circumferential direction, wherein
    the inner annular portion has a first axial end surface and a second axial end surface,
    the first axial end surface has an oil passage groove for guiding lubricating oil to the plurality of pockets,
    the second axial end surface is recessed, relative to the first axial end surface in the axial direction of the inner annular portion so as to form a recessed portion that communicates with the oil passage groove,
    the first axial end surface has a region that is located radially directly inside the plurality of cage bars, and
    the entire region is located radially outside the second axial end surface.

2. The thrust roller bearing cage according to claim 1, wherein
    the second axial end surface has an annular shape and is located around a radially inner edge of the inner annular portion.

3. A thrust roller bearing comprising:
    the thrust roller bearing cage according to claim 2;
    a plurality of rollers retained by the thrust roller bearing cage; and
    a pair of bearing washers having raceways where the plurality of rollers roll, the pair of bearing washers sandwiching the thrust roller bearing cage in the axial direction.

4. The thrust roller bearing cage according to claim 1, wherein
    the second axial end surface has a connection portion that is connected to the oil passage groove, and
    a width of the connection portion in the circumferential direction decreases outward in the radial direction of the inner annular portion.

5. A thrust roller bearing comprising:
the thrust roller bearing cage according to claim 4;
a plurality of rollers retained by the thrust roller bearing cage; and
a pair of bearing washers having raceways where the plurality of rollers roll, the pair of bearing washers sandwiching the thrust roller bearing cage in the axial direction.

6. The thrust roller bearing cage according to claim 1, wherein
the oil passage groove has an opening in a radially inner wall surface of each of the plurality of pockets.

7. A thrust roller bearing comprising:
the thrust roller bearing cage according to claim 6;
a plurality of rollers retained by the thrust roller bearing cage; and
a pair of bearing washers having raceways where the plurality of rollers roll, the pair of bearing washers sandwiching the thrust roller bearing cage in the axial direction.

8. The thrust roller bearing cage according to claim 1, wherein
the oil passage groove has a portion that is located in the plurality of cage bars in the first axial end surface and that has an opening in a side wall surface of each of the plurality of pockets, and
the side wall surface faces in the circumferential direction.

9. A thrust roller bearing comprising:
the thrust roller bearing cage according to claim 8;
a plurality of rollers retained by the thrust roller bearing cage; and
a pair of bearing washers having raceways where the plurality of rollers roll, the pair of bearing washers sandwiching the thrust roller bearing cage in the axial direction.

10. A thrust roller bearing comprising:
the thrust roller bearing cage according to claim 1;
a plurality of rollers retained by the thrust roller bearing cage; and
a pair of bearing washers having raceways where the plurality of rollers roll, the pair of bearing washers sandwiching the thrust roller bearing cage in the axial direction.

* * * * *